United States Patent [19]
Courtois

[11] 3,744,950
[45] July 10, 1973

[54] PRESSURE MOLDING DEVICE

[76] Inventor: Paul Courtois, 151 Boulevard de Stalingrad 94, Vitry-Sur-Seine, France

[22] Filed: June 9, 1971

[21] Appl. No.: 151,223

[30] Foreign Application Priority Data
June 9, 1970 France .............................. 7021133

[52] U.S. Cl. ................................ 425/186, 425/414
[51] Int. Cl. ............................................. B29c 3/00
[58] Field of Search ................... 425/414, 186, 422, 425/412

[56] References Cited
UNITED STATES PATENTS

| | | |
|---|---|---|
| 2,211,621 | 8/1940 | Hoch .............................. 425/412 X |
| 1,142,696 | 6/1915 | Goaf et al. .......................... 425/412 |
| 1,602,598 | 10/1926 | Stebbins ............................ 425/412 |
| 3,327,622 | 6/1967 | Lebovitz ........................ 425/412 X |

Primary Examiner—Robert L. Spicer, Jr.
Attorney—Craig, Antonelli & Hill

[57] ABSTRACT

Pressure molding device comprising a core fixed to a support driven in a horizontal sliding movement along a vertically mobile plate, from a position immediately adjacent to the mold to a position at a distance from the said mold and vice-versa, means being provided for positioning the said support exactly adjacent to the said mold before the molding operation. The invention can be used more particularly for molding storage cell containers having a great height.

11 Claims, 4 Drawing Figures

Patented July 10, 1973 3,744,950
2 Sheets-Sheet 1
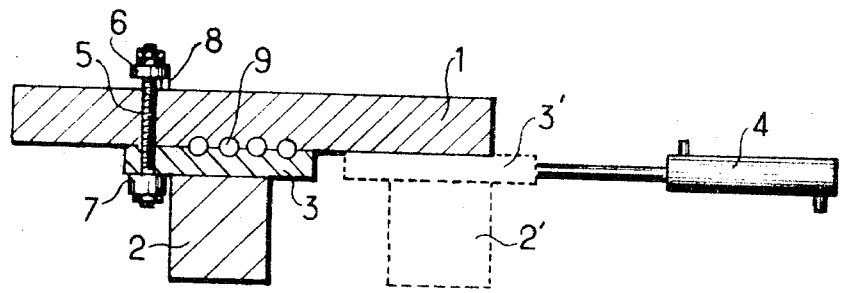
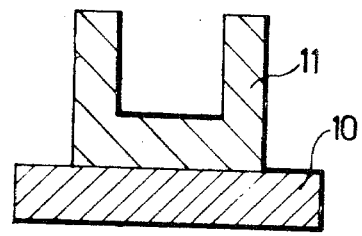
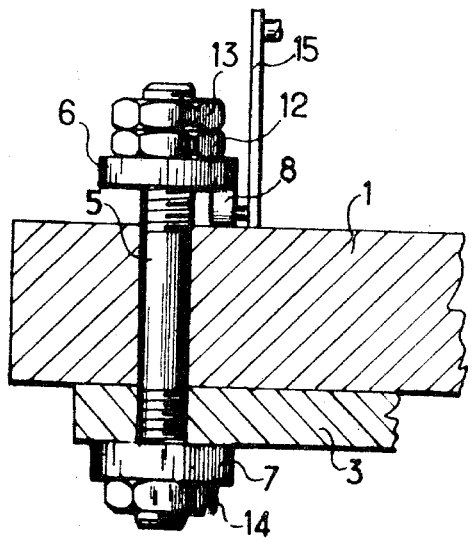
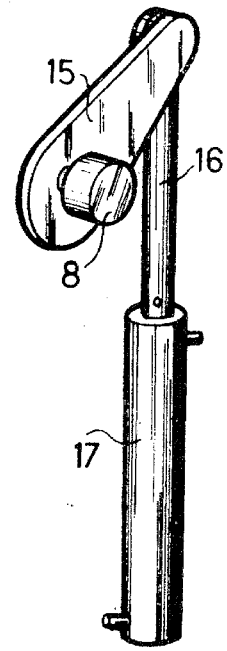
INVENTOR
PAUL COURTOIS
BY Craig, Antonelli & Hill
ATTORNEYS Patented July 10, 1973

INVENTOR
PAUL COURTOIS
BY Craig, Antonelli & Hill
ATTORNEYS

PRESSURE MOLDING DEVICE

The object of the present invention is a pressure molding device.

Pressure molding of various articles made more particularly of plastic materials is conventionally accomplished by using presses whose upper plate, which is mobile and generally vertically slidable comprises a core having a shape as well as dimensions suited to those of the article to be produced. This core is firstly inserted in a mold containing a certain quantity of plastic material and then raised after molding to a height at least equal to that of the article, so that it may be removed from the mold.

Consequently, taking into account the height of the mold, the distance between plates at the instant of unmolding is greater than three times the height of the article. The result is that such presses have a particularly large vertical bulk, especially when they are intended for the production of articles having great height.

The present invention proposes to overcome such disadvantages. Its aim is the production of a pressure molding device enabling articles to be produced according to predetermined and strictly constant dimensions, more particularly thickness, while having slight bulk.

The object of the invention is a pressure molding device of the type comprising a core supported by a mobile plate which is vertically slidable and can be inserted in a subjacent mold mounted on a fixed plate, characterized in that means are provided, on the one hand, for driving the said core with a horizontal sliding movement from a position in which it is immediately adjacent to the said mold, to a position in which it is at a distance from the latter and vice-versa, and on the other hand, for positioning the said core exactly adjacent to the said mold before the molding operation.

Other characteristics and advantages of the invention become apparent from the following description, given by way of a merely illustrating example which has no limiting character, with reference to the accompanying drawings and diagrams in which:

FIG. 1 is a diagrammatic sectional view of the molding device as a whole according to the invention;

FIG. 2 shows one of the bolts for tightening the support against the mobile plate, as well as its drive element according to the invention;

FIG. 3 shows the drive cam of each of the bolts, as well as its control device.

Figure 4:
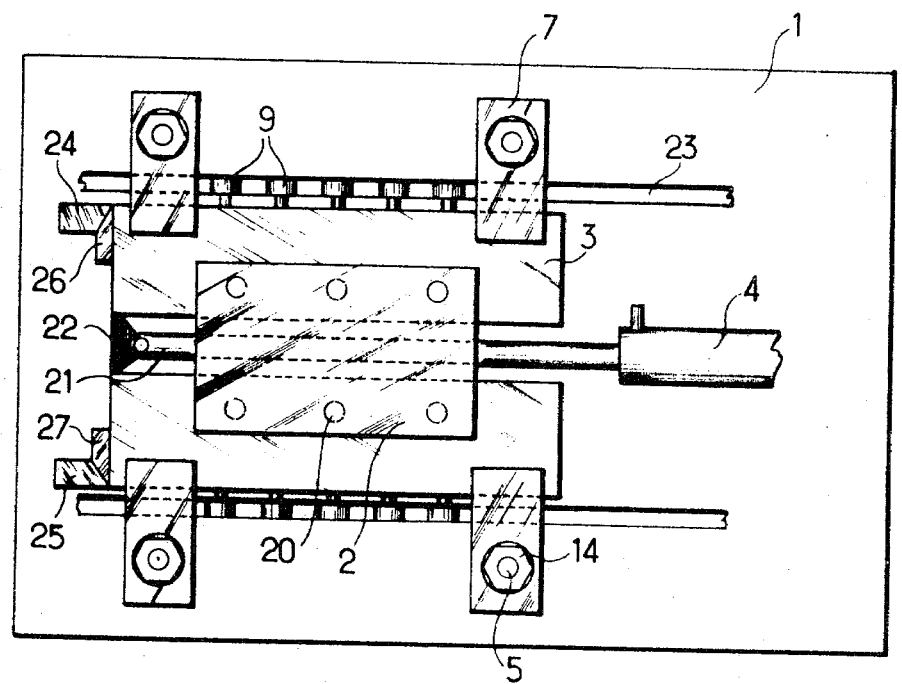
FIG. 4 is a bottom view of the core, and of its drive support according to the invention.

FIG. 1 shows a molding device consisting essentially of a mobile plate 1 having a vertical sliding movement, as well as a molding core 2, fast with a support provided with rollers 9 (FIG. 4), in the embodiment described, which can be driven in a horizontal sliding movement on the lower face of the said mobile plate by means of a jack 4. The core 2 and its support 3 can, in this way, come and occupy, respectively, positions 2' and 3', and vice-versa, such positions being shown by intermittent lines in the figure. Before the molding operation, the support 3 is pressed hard against the lower face of the mobile plate 1 by means of bolts such as 5 operating in connection with a ring 6 and a flange 7, the said bolts being driven each by means of a cam 8, such elements being more particularly described with reference to FIGS. 2 and 3. The fixed plate 10 on which the mold itself or the molding die 11 is mounted has also been illustrated in the figure.

FIGS. 2 and 3 specify the structure of one of the elements for tightening the support 3 against the plate 1. Hence, the bolt 5 comprises on its upper part the ring 6 held in position by means of the nut 12 and lock nut 13 and mounted resting on the cam 8. The lower part of the said bolt 5 comprises a nut 14 mounted resting on the tightening rim 7 of the support 3. Furthermore, the said cam 8 is driven in a rotational movement by means of a lever 15 articulated on the end of the piston 16 of the jack 17.

FIG. 4 enables details and elements which are not illustrated in the preceding figures to be specified.

Hence, the support 3 consists of two halves connected together by the core 2 itself, fixed by suitable means 20, the spacing between such halves allowing the piston 21 of the jack 4 to pass, the end of such a piston being connected to a yoke 22 fast with the front part of the support 3. The tightening flanges 7 can also be seen, each of these being tightened by a bolt 5.

Moreover, on the one hand, the rollers 9 of the support 3, rolling on rails 23 provided on the plate 1, and on the other hand, the chocks 24 and 25 which can be driven in relation to the said plate 1 and mounted resting respectively against the shoulders 26 and 27 fast with the front of the said support 3, have been illustrated. The contacting faces of the said chocks and of their respective shoulders consist of flats cut at about 45°.

Such a molding device operates as follows:

It is assumed that the core 2 and its support 3 occupy the positions shown by continuous lines in FIG. 1. Furthermore, the flanges 7 are unfastened from the support 3 subsequent to the withdrawal of the piston 16 into the body of the jack 17, the cam 8 then supporting the ring 6 of each of the bolts 5 by its part having a small radius of curvature. The core 2 is then accurately positioned adjacent to the mold 11; for that purpose, it is longitudinally positioned by manipulating simultaneously the two chocks 24 and 25, whereas it is laterally positioned by shifting one of the chocks in relation to the other according to the required direction. During these operations, the support 3 is thus shifted in the required direction by the effort exerted by the chocks on their respective shoulders 26 and 27 fast with the said support.

At that instant, the support 3 is tightened hard against the mobile plate 1, by actuating the jack 17 which pushes the piston 16 out, the latter pivoting the lever 15, thus driving the cam 8 in a rotational movement, the latter lifting the ring 6 and the bolt 5 each connected to one of the said flanges, by means of its part having a large radius of curvature. The result is that the flanges 7 are tightened by the nuts 14 against the support 3 thus held in position. It is then possible to mold the part by moving the mobile plate 1 downwards and inserting the core 2 in the mold 11. The molding operation being furnished, the plate 1 is raised up to the position shown in FIG. 1, substantially, and by manipulating the jack 17, driving the cam 8, the flanges 7 are loosened. The use of the jack 4 then enables the support 3 to be brought into the position 3' through the rollers 9 on the rails 23. Such an operation enables the molded part (not shown) to be removed easily from the mold 11. A further manipulation of the jack 4 brings the core 2 back again adjacent to the mold 11, the support 3 coming up to the chocks 24 and 25 which are adjusted if required, and so on.

The device which is the object of the invention can be used in all cases where pressure molding of articles having, more particularly, a predetermined and strictly constant thickness are to be produced. In particular, it enables, to great advantage, the production of storage cell containers having a great height while having a relatively slight bulk, in the order of only twice the height of such containers.

It must be understood that the invention is in no way limited to the embodiment described and illustrated, which has been given only by way of an example, More particularly, without going beyond the scope of the invention, details may be modified, certain arrangements may be changed, or certain means may be replaced by equivalent means.

I claim:

1. In a pressure molding device of the type including a core supported by a mobile plate which is vertically displaceable so that said core is movable into and out of engagement with a subjacent mold mounted on a fixed plate, means for adjusting said mobile plate comprising drive means for driving said core with a horizontal sliding movement between one position in which it is arranged immediately adjacent to the said mold and a second position in which it is at a distance from the latter, adjusting means for positioning the said core on said mobile plate exactly in registration with the said mold before vertical movement of said mobile plate prior to the molding operation, and locking means for selectively tightening said support against said mobile plate including at least one flange movably supported on a bolt mounted on said mobile plate and pressing means for selectively pressing said flange against said support, characterized in that said drive means for moving said core with a horizontal sliding movement includes a support movable on the surface of said mobile plate facing said mold, and in that said support is driven with a sliding movement by means of rollers thereon rolling on rails secured to said mobile plate.

2. Device according to claim 1, characterized in that said adjusting means for positioning the core consists of two chocks secured to the mobile plate in an adjustable manner so as to be capable of being shifted on the latter, and a shoulder provided on said support to rest against each of the said chocks.

3. Device according to claim 2, characterized in that the contacting faces of the said chocks and said shoulders consist of flat surfaces cut substantially at 45° to the axis of said mobile plate.

4. Device according to claim 1, characterized in that said locking means includes a plurality of bolts having flanges and said pressing means includes cam means on each bolt for displacing said flanges.

5. Device according to claim 4, characterized in that said cam means includes a cam bearing on a ring retained substantially on the upper part of each of the said bolts.

6. In a pressure molding device of the type including a core supported by a mobile plate which is vertically displaceable so that said core is movable into and out of engagement with a subjacent mold mounted on a fixed plate, means for adjusting said mobile plate comprising drive means for driving said core with a horizontal sliding movement between one position in which it is arranged immediately adjacent to the said mold and a second position in which it is at a distance from the latter, adjusting means for positioning the said core on said mobile plate exactly in registration with the said mold before vertical movement of said mobile plate prior to the molding operation, and locking means for selectively tightening said support against said mobile plate including at least one flange movably supported on a bolt mounted on said mobile plate and pressing means for selectively pressing said flange against said support.

7. Device according to claim 6, characterized in that said drive means for moving said core with a horizontal sliding movement includes a support movable on the surface of said mobile plate facing said mold.

8. Device according to claim 6, characterized in that said locking means includes a plurality of bolts having flanges and said pressing means includes cam means on each bolt for displacing said flanges.

9. Device according to claim 8, characterized in that said cam means includes a cam bearing on a ring retained substantially on the upper part of each of the said bolts.

10. Device according to claim 6, characterized in that said adjusting means for positioning the core consists of two chocks secured to the mobile plate in an adjustable manner so as to be capable of being shifted on the latter, and a shoulder provided on said support to rest against each of the said chocks.

11. Device according to claim 10, characterized in that the contacting faces of the said chocks of said shoulders consist of flat surfaces cut substantially at 45° to the axis of said mobile plate.

* * * * *